UNITED STATES PATENT OFFICE.

FRED M. LOCKE, OF VICTOR, NEW YORK.

INSULATOR.

1,091,679. Specification of Letters Patent. Patented Mar. 31, 1914.

No Drawing. Original application filed March 9, 1909, Serial No. 482,382. Divided and this application filed November 21, 1913. Serial No. 802,295.

*To all whom it may concern:*

Be it known that I, FRED M. LOCKE, of Victor, in the county of Ontario, in the State of New York, have invented new and useful Improvements in Insulators, of which the following is a full, clear, and exact description.

This invention relates to certain improvements in insulators and to a composition for forming insulators for high potential electric conductors, and is a division of my application Serial No. 482,382, for the manufacture of insulators for high potential electric conductors, filed March 9, 1909, and refers more particularly to a composition electric insulation as a new article of manufacture, the ingredients of which are boron or a boron compound in combination with a vitrifiable base, and although this base may be formed of the usual glass ingredients or porcelain ingredients, or may be an aluminum silicate such as feldspar, yet I prefer, in view of the lessened cost, to use simply silica.

The primary object of my present invention is to increase the inductive capacity, dielectric strength, and heat resisting properties of this class of insulators to more effectively resist puncture or disintegration by an electric current or static changes therefrom, or from temperature or climatic changes.

The broad invention consists in incorporating a suitable quantity of boron or a boron compound in a vitrifiable or fusible base, to increase the inductive capacity, dielectric strength and resistance to puncture or disintegration by the electric current and sudden temperature or climatic changes, and reference is hereby made to my pending application Serial No. 497,095, plastic compositions, filed May 19, 1909, in which I have claimed such a base in connection with a boron compound.

As an example of the advantages of an insulator formed of the ingredients herein described, in the experiments which I have made to determine the relative specific inductive capacity of air, glass, porcelain and this composition, I find that the specific inductive capacity of this composition is three times as great as that of the commercial porcelain insulators of the same size and form; six times as great as glass, and twelve times as great as air.

In the tests which I have made to determine the resistance to puncture by high voltage, I find that where a porcelain insulator of the best quality was capable of resisting 80,000 volts, an insulator made of my improved composition and of the same size and form as the porcelain insulator withstood 100,000 volts, or 20,000 volts more than the porcelain insulator, which was due solely to the increased specific inductive capacity and dielectric strength produced by the boron or boron compound. This high inductive capacity and dielectric strength is probably due to the fact that boron is practically the only non-metallic element that forms no compound with hydrogen.

The manufacture of high potential porcelain insulators is well understood and in the formation of an insulator from my improved composition, the boron or the boron compound, such as boracic acid, and the base ingredient or ingredients are thoroughly mixed in suitable proportions, the proportion of boron or of the boron compound ranging anywhere from 1% to 60%, according to the specific inductive capacity required, although the smallest percentage is effective in adding materially to the dielectric strength and tenacity of the insulator.

What I claim is:

1. An insulating compound comprising silica and boron fused together in a homogeneous body.

2. An insulator composed of a vitrifiable base and boron fused together to form a homogeneous body.

3. An insulator composed of a fusible base and boron fused together to form a homogeneous body.

4. An insulator formed of silica and boron fused together.

In witness whereof I have hereunto set my hand.

FRED M. LOCKE.

Witnesses:
G. C. BRADSTREET,
R. G. DANN.